United States Patent
Soni et al.

(10) Patent No.: US 12,554,305 B2
(45) Date of Patent: Feb. 17, 2026

(54) SYSTEM POWER BALANCING VIA ON-DIE TELEMETRY DATA

(71) Applicant: NVIDIA Corporation, Santa Clara, CA (US)

(72) Inventors: Tejvansh Singh Soni, Union City, CA (US); Xutong Li, San Jose, CA (US); Sreedhar Narayanaswamy, Sunnyvale, CA (US); Chad Plummer, Fairfax, CA (US); Pratikkumar Dilipkumar Patel, Milpitas, CA (US); Tao Li, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 144 days.

(21) Appl. No.: 18/221,619

(22) Filed: Jul. 13, 2023

(65) Prior Publication Data
US 2025/0021149 A1    Jan. 16, 2025

(51) Int. Cl.
| | |
|---|---|
| G06F 1/3209 | (2019.01) |
| G06F 1/28 | (2006.01) |
| G06F 1/3296 | (2019.01) |
| G06F 13/00 | (2006.01) |

(52) U.S. Cl.
CPC .............. *G06F 1/28* (2013.01); *G06F 1/3296* (2013.01)

(58) Field of Classification Search
CPC ......... G06F 1/28; G06F 1/3296; G06F 1/3206
See application file for complete search history.

(56) References Cited

U.S. PATENT DOCUMENTS

| | | | | |
|---|---|---|---|---|
| 9,477,279 B1* | 10/2016 | Piszczek | ................. | G06F 1/206 |
| 2007/0180281 A1* | 8/2007 | Partovi | ............... | G06F 13/4072 |
| | | | | 713/320 |
| 2010/0162006 A1* | 6/2010 | Therien | ................. | G06F 1/3203 |
| | | | | 713/300 |
| 2016/0267041 A1* | 9/2016 | Jose | ........................ | G06F 1/3253 |
| 2018/0188797 A1* | 7/2018 | Wang | ................... | G06F 1/3275 |
| 2018/0307295 A1* | 10/2018 | Tameem | ............... | G06F 1/3296 |
| 2024/0353909 A1* | 10/2024 | Nieuwsma | ............ | G06F 1/3206 |
| 2024/0427710 A1* | 12/2024 | Akavaram | .......... | G06F 13/4221 |

\* cited by examiner

*Primary Examiner* — Henry Tsai
*Assistant Examiner* — Kim T Huynh
(74) *Attorney, Agent, or Firm* — Lowenstein Sandler LLP (57) ABSTRACT

A system includes a processing unit coupled with one or more switches via one or more links. The processing unit is to determine a total threshold power value associated with the processing unit and the one or more links and estimate a power consumption value associated with a switch of the one or more switches. The processing unit can also determine the power consumption value of the switch and a second power consumption value of the processing unit fail to satisfy the total power threshold value and responsive to determining the power consumption value and the second power consumption value fail to satisfy the total power threshold value, increase an amount of power supplied to the processing unit to satisfy the total power threshold value.

20 Claims, 7 Drawing Sheets

SYSTEM POWER BALANCING VIA ON-DIE TELEMETRY DATA

TECHNICAL FIELD

At least one embodiment pertains to using processing resources to perform and facilitate system power balancing in a data center, according to various novel techniques described herein. More specifically, to power balance between one or more switches and one or more graphics processing units (GPUs) in a system.

BACKGROUND

Data centers can store and process data for various purposes. Data centers can use graphics processing units (GPUs), central processing units (CPUs), data processing units (DPUs), etc., for processing and managing data in the system. As data centers process or handle more data, systems perform parallel computations via parallel computers or parallel accelerators. Accordingly, devices (e.g., GPUs, CPUs, DPUs) exchange information with each other via one or more links and one or more switches—e.g., a first GPU can be coupled with one or more switches via one or more links to communicate with a second GPU also coupled with the one or more switches. In some embodiments, power is provisioned for devices at a peak bandwidth, even if actual or average use bandwidth is lower. For example, power for a switch is provisioned for peak bandwidth, even though, in practice, the switch can enter idle modes when data is not communicated between GPUs or CPUs. Accordingly, there is often provisioned power that is not utilized by the system, which can reduce overall system performance and efficiency.

BRIEF DESCRIPTION OF DRAWINGS

Various embodiments in accordance with the present disclosure will be described with reference to the drawings, in which.

DETAILED DESCRIPTION

As described above, devices in a data center (e.g., graphics processing units (GPUs), central processing units (CPUs), and data processing units (DPUs)) can be used for processing data. To increase data processing efficiency, data centers can utilize parallel computation via parallel computers or parallel accelerators. For example, the data center can use multiple GPUs in parallel to process data associated with an operation or task. In such examples, the devices can be coupled with one another via one or more links and one or more switches—e.g., devices can be coupled with one another to communicate while parallel computation occurs. For example, multiple GPUs can be coupled together via one or more links and one or more switches—e.g., a first GPU can be coupled via a first link to a first switch, and a second GPU can be coupled via a second link to the first switch, enabling the first and second GPU to communicate with each other.

In at least one embodiment, power is provisioned for one or more devices of the data center at a peak bandwidth—e.g., power is provisioned for maximum performance of each device. However, the actual power used (e.g., actual bandwidth) is, on average, lower than the peak bandwidth for some devices. For example, the switch coupling the first GPU and second GPU can enter an idle mode (e.g., become inactive) when there is no data being communicated between the first and second GPUs. Accordingly, the switch is not utilizing the peak power at all times, even though the system has provisioned peak power for the switch at all times. This can cause the overall power of the system to be below the provisioned power, reducing overall performance of the system—e.g., some of the provisioned power is wasted and causes inefficiencies in the system. In some solutions, requesting power information of the switch and receiving at the GPU to increase or decrease power can be infeasible due to latencies—e.g., power can be regulated over tens of milliseconds, but requesting the power of the switch can take longer than a hundred (100) milliseconds.

Advantageously, aspects of the present disclosure can address the deficiencies above and other challenges by performing power balancing between the GPU and switch. In one example, the system can utilize on-die telemetry data to perform the power balancing. For example, the GPU can sample link power used and estimate switch power accordingly—e.g., if the link is inactive or in an idle mode, the GPU can estimate that the switch is also inactive or in an idle mode. Accordingly, the GPU can estimate the power of the switch, even if the switch is not on a same baseboard as the GPU. Based on estimating the switch power, a power management unit (PMU) of the GPU can increase the power of the GPU while the switch is inactive or idle (i.e., in an idle mode). In one example, the PMU can increase the power of the GPU to satisfy a total power value provisioned for the system. That is, the PMU can calculate a total power in the system, determine that the switch is idle, and use the power that is otherwise provisioned for the switch on the GPU instead. The PMU can also constantly sample the link power to also estimate when the switch is in an active mode (e.g., out of the idle mode and using power). Accordingly, the PMU can also reduce the power consumption of the GPU when the switch is active to ensure the total power value is satisfied.

By using power balancing between at least the switch and the GPU, the system can better ration provisioned power throughout the system. When the switch is idle, the system can increase the power at the GPU to enable faster processing and improve the overall performance of the system. By balancing the power while the switch is idle, the system can avoid wasting power and improve the overall efficiency of the system.

Figure 1:
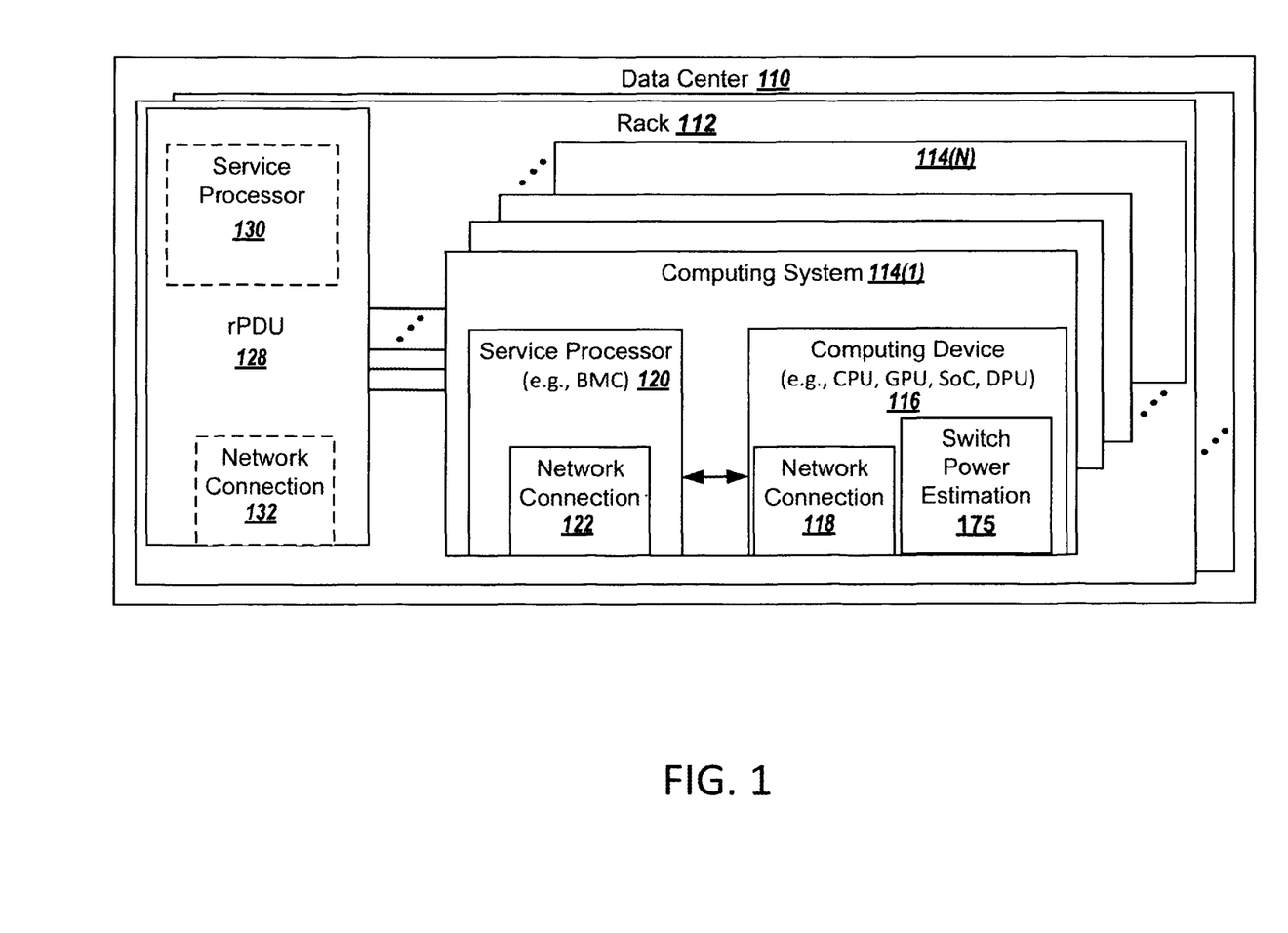
FIG. 1 illustrates an example system utilizing power balancing via on-die telemetry data, in accordance with at least some embodiments.

FIG. 1 is a block diagram of a system 100 implementing system power balancing via on-die telemetry, according to at least one embodiment. The system 100 can include a data center 110 coupled to a network 103. In some embodiments, the system 100 can include a client device 124 coupled with the network 103.

The data center 110 can include a rack 112 of one or more computing systems 114(1)-114(N), where N is a positive integer equal to or greater than zero. Each computing system 114 can include a computing device 116 and a service processor 120. In at least one embodiment, the computing device 116 can be considered a node. In other embodiments, multiple computing devices 116 can be considered a node— e.g., a node can include one or more computing devices 116. In some embodiments, the computing device 116 can be an example of a graphics processing unit (GPU) or central processing unit (CPU). Although one computing device 116 is shown for each computing system 116, it should be noted that each computing system 114 can include any number of computing devices 116 greater than one (1). In at least one embodiment, the service processor 120 is a baseboard management controller (BMC). The BMC can be part of an IPMI-type interface and located on a circuit board (e.g., motherboard) of the computing device 116 being monitored. The BMC can include one or more sensors that are operatively coupled to the computing device 116 or integrated within the computing device 116. The sensors of a BMC measure internal physical variables such as temperature, humidity, power-supply voltage, fan speeds, communications parameters, and operating system (OS) functions. The BMC can provide a way to manage a computer that may be powered off or otherwise unresponsive. The service processor 120 provides out-of-band functionality by collecting the power consumption data of the computing device 116 independently from the computing device's CPU, firmware, and OS. The service processor 120 can provide the power consumption data via a network connection 122 independent from a primary network connection 118 of the computing device 116. The service processor 120 can use the network connection 122 to the hardware itself rather than the OS or login shell to manage the computing device 116, even if the computing device 116 is powered off or otherwise unresponsive. Although one rack 112 is illustrated, the data center 110 can include any number of racks 112 equal to or greater than one (1). In at least one embodiment, each computing system 114 (e.g., or the set of computing systems 114(1) through 114(N)) can be an example of a computer cluster—e.g., a set of computers that work concurrently. For example, the computing system 114 can have each node set to perform a same operation scheduled and controlled by software. In at least one example, the computing system 114 can be an example of or include NVIDIA DGX servers and workstations.

In at least one embodiment, the rack 112 can be coupled with or include a rack power distribution unit (rPDU) 128—e.g., the rPDU 128 can be coupled with multiple racks 112, or each rack 112 can include an rPDU 128. In some embodiments, the rPDU 128 can provide power to computing device 116 of the rack 112 and computing systems 114. In some embodiments, the rPDU 128 can include a service processor 130 and be connected to the network via network connection 132.

In at least one embodiment, each computing device 116 or the computing system 114 can include a switch power estimation 175. In such embodiments, the computing system 114 or the computing device 116 can perform power balancing between the computing device 116 (e.g., a GPU) and a switch coupled with the computing device 116 as described with reference to FIGS. 2-6. That is, there may be a total threshold amount of power allocated between the computing device 116 and a coupled switch. In some embodiments, when the switch is using less power than allocated, the computing device 116 can increase its power to satisfy the total threshold power and take advantage of the power not used by the switch.

Figure 2A:
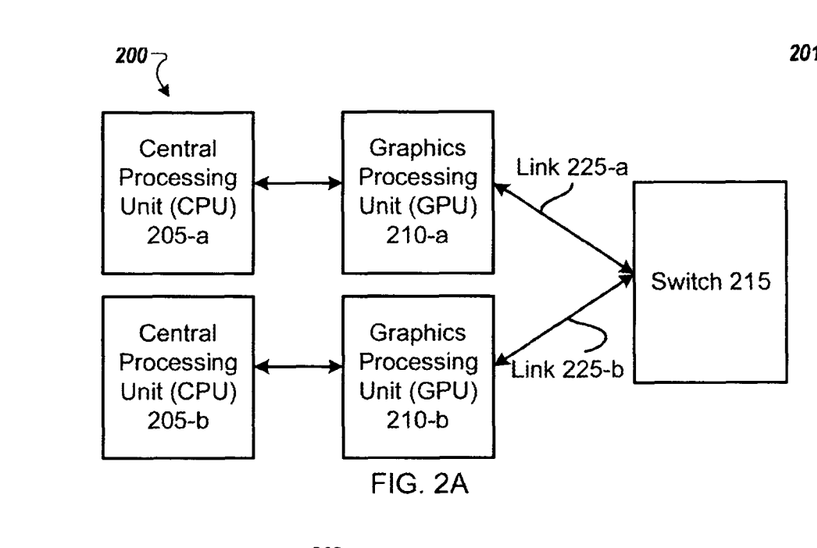
FIGS. 2A, 2B, and 2C illustrate example systems utilizing power balancing via on-die telemetry data, in accordance with at least some embodiments.
Figure 2B:
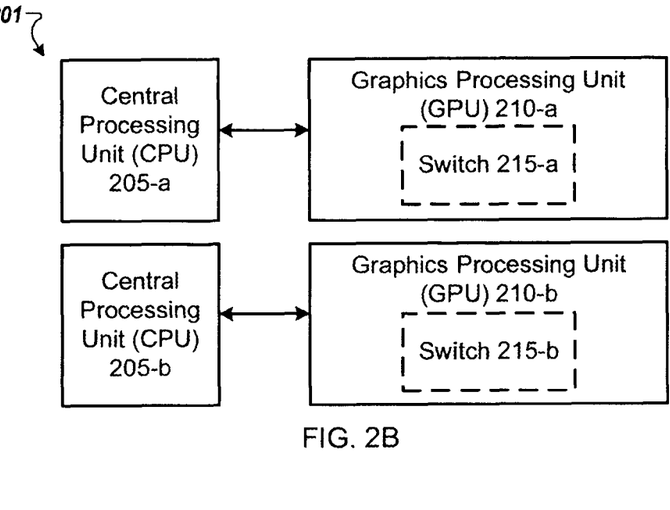
Figure 2C:
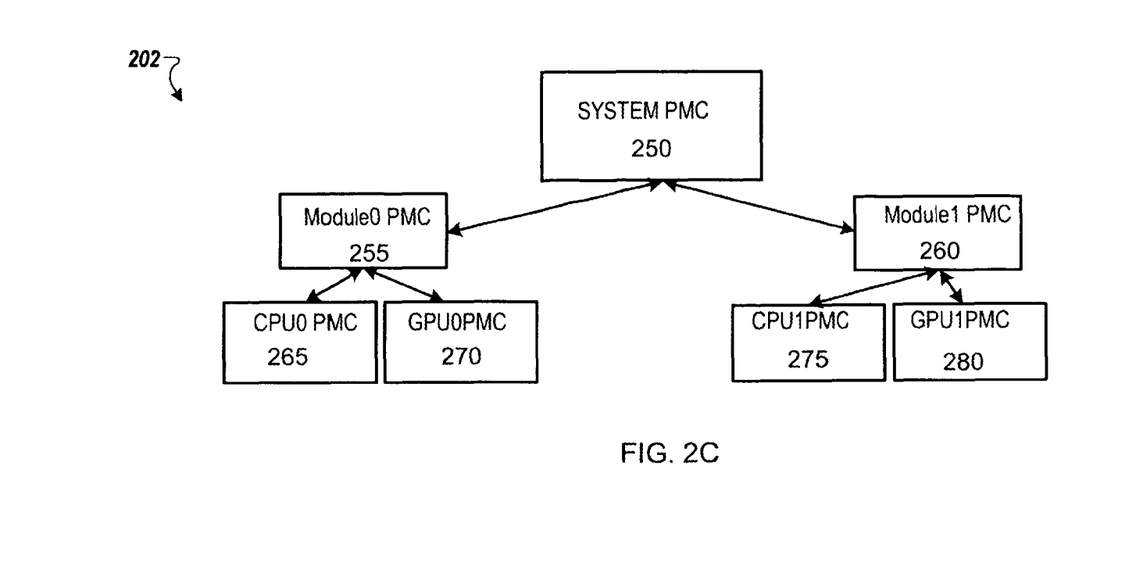

FIGS. 2A, 2B, and 2C illustrate example systems 200, 201, and 203 for power balancing via on-die telemetry data, according to at least one embodiment. System 200 can include a central processing unit (CPU) 205, a graphics processing unit (GPU) 210, and a switch 215. It should be noted that a number of CPUs 205, GPUs 210, and switches 215 shown are for illustrative purposes only. The system 200 can include any number of CPUs 205, GPUs 210, and switch 215.

In one embodiment, system 200 represents a physical diagram of the system 200. For example, the system 200 can include one or more CPUs 205. In at least one embodiment, the CPU 205 can provide instructions and/or processing power to process data of the data center shown in FIG. 1. In at least one embodiment, CPU 205-$a$ is coupled to a GPU 210-$a$. In one embodiment, GPU 210 can perform calculations (e.g., calculations relating to graphics). In some embodiments, CPU 205-$a$ and GPU 210-$a$ can perform operations at a same time, increasing the processing power of the system.

In at least one embodiment, CPU 205-$b$ can be coupled with GPU 210-$b$. In at least one embodiment, CPU 205-$b$ and GPU 210-$b$ can perform operations in parallel with CPU 205-$a$ and GPU 210-$a$—e.g., CPU 205-$a$ and GPU 210-$a$ can perform parallel computations with CPU 205-$b$ and GPU 210-$b$. As the GPU 210-$a$ and GPU 210-$b$ can be performing parallel computations, a switch 215 can couple the GPU 210-$a$ with GPU 210-$b$. Accordingly, GPU 210-$a$ can communicate with GPU 210-$b$. In at least one embodiment, link 225-$a$ can couple the GPU 210-$a$ with switch 215, and link 225-$b$ can couple the GPU 210-$b$ with switch 215. In at least one embodiment, the link 225 can be an example of an NVIDIA NVLink, and the switch 215 can be an example of an NVIDIA NVSwitch. In some embodiments, the switch 215 is located outside the GPU 210. In some embodiments, the switch 215 is located on a different baseboard (e.g., a system board that is a printed circuit board in the system 200) than GPU 210. In either embodiment, the GPU 210 can estimate the switch 215 power based on performing on-die telemetry and determining link power as described with reference to FIG. 3.

FIG. 2B illustrates a system 201 representing a system model where the switch 215 is subsumed as a virtual block of the GPU 210—e.g., although the switch can be located outside the GPU 210 as indicated in System 200, the software of system 200 can treat the switch 215 as if it was a virtual block of GPU 210. In such embodiments, the switch 220 and the GPU 210 can share a power budget. That is, the system can provision a power budget (e.g., a total power value) to the GPU 210 and the switch 220 in total since the switch 220 is treated as a virtual block of the GPU 210. As described above, the system can provision power for a peak bandwidth—e.g., a peak bandwidth for the switch 220 and a peak bandwidth for the GPU 210. In at least one embodiment, the GPU 210 can use additional power (e.g., the GPU can increase its power consumption) if the switch 220 is idle, as described with reference to FIGS. 3 and 4.

In at least one embodiment, by treating the switch 220 as a virtual block of the GPU 210, software of system 201 can treat devices with the hierarchy illustrated with reference to FIG. 2C.

In some embodiments, the system PMC 250 is a system power management controller (PMC) that run on a server. In some embodiments, the module0 PMC 255 and module1 PMC 260 are PMCs that runs on the CPU. The CPU0 PMC 265 and CPU1 PMC 275 are PMCs that run on a dedicated microcontroller on the CPU, and the GPU0 PMC 270 and GPU PMC 280 are a PMC that run on a dedicated microcontroller on the GPU. Because the switch 215 is treated as a virtual block, the power consumption can be handled and otherwise provisioned for GPU0 PMC 270 or GPU1 PMC 280.

Figure 3:
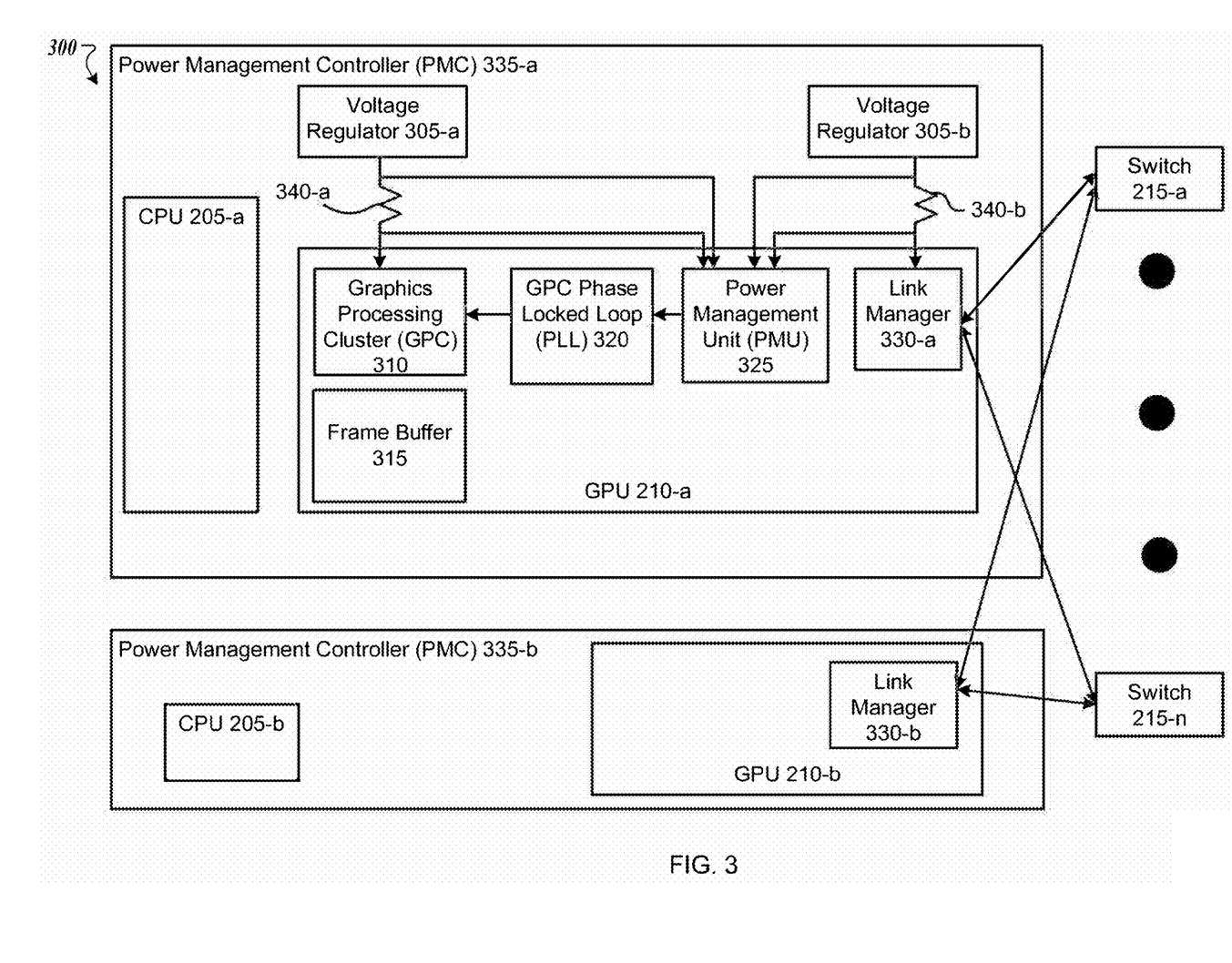
FIG. 3 illustrates an example system utilizing power balancing via on-die telemetry data, in accordance with at least some embodiments.

FIG. 3 illustrates an example system 300 implementing power balancing via on-die telemetry data, according to at least one embodiment. In some embodiments, system 300 can include a power management controller (PMC) 335-a and a PMC 335-b. In at least one embodiment, the PMC 335 can include a CPU 205 (e.g., a central processing unit (CPU) 205 as described with reference to FIG. 2) and a GPU 210 (e.g., a graphics processing unit (GPU) 210 as described with reference to FIG. 2). In at least one embodiment, the PMC 335 is coupled with a switch 215 as described with reference to FIG. 2—e.g., switch 215-a and switch 215-n can be coupled with GPU 210-a and GPU 210-b. In at least one embodiment, the PMC 335 can also include a voltage regulator 305-a and a voltage regulator 305-b. In at least one embodiment, GPU 210 can include a graphics processing cluster (GPC) 310, a frame buffer (FB) 315, a GPC phase-locked loop (PLL) 320, a power management unit (PMU) 325, and a link manager 330.

In at least one embodiment, the GPC 310 is a dedicated hardware block that can perform computations, rasterization, shading, and texturing—e.g., the GPC 310 can perform most of a GPU's core graphics functions. In at least one embodiment, frame buffer 315 is a portion of memory (e.g., random-access memory (RAM)) that stores a bitmap and drivers a video display—e.g., the frame buffer 315 can store data representing pixels in a video frame, a frame rate, or other information associated with a display of the system. In one embodiment, the GPC 310 is coupled with a GPC PLL 320. In at least one embodiment, the GPC PLL 320 is a circuit with a voltage or voltage-driven oscillator that adjusts the frequency of an input signal from the PMU 325. That is, the GPC PLL 320 generates, stabilizes, or modulates signals from the PMU 325 to the GPC 310.

In at least one embodiment, power management unit (PMU) 325 can manage power of the GPU 210—e.g., the PMU 325 can increase or decrease the power supplied to the GPU 210 and individual components GPC 310, Frame Buffer 315, the GPC PLL 320, and the link manager 330. In at least one embodiment, the PMU 325 is coupled to the voltage regulator 305-a and voltage regulator 305-b. In such embodiments, the PMU 325 can determine a power supplied to the GPC 310 or the link manager 330 by determining a potential across resistance across 340-a or resistance 340-b, respectively. In some embodiments, the potential across resistance 340-a or resistance 340-b is determined by an input current limiter (ICL). In such embodiments, the ICL can provide the PMU 325 with the determined power. In other embodiments, the ICL is part of the PMU 325.

As described above, GPU 210-a and GPU 210-b can perform parallel computations and communicate information with each other. In such embodiments, the GPUs 210 can be coupled with one or more links and switches 215 in order to communicate with other GPUs 210. For example, GPU 210-a can communicate with GPU 210-b via either switch 215-a or switch 215-b. In at least one embodiment, link manager 330 can manage the links coupled to the switches 215. For example, the link manager 330 can manage power to a respective link, receive data, process data, transmit data, etc. In at least one embodiment, the PMU 325 (e.g., ICL) can sample the power to the link and estimate a proportional switch 215 power—e.g., estimate a power the switch is proportionally using for a respective GPU 210. In some embodiments, the PMU 325 can sample at a rate (e.g., three microseconds) that is shorter than a period that determines an average power usage—e.g., shorter than a period over which the power usage is determined. In at least one embodiment, the PMU 325 can sample at a rate based on an electrical time constant or thermal time constant of a power delivery network (PDN) associated with the system 200.

In at least one embodiment, GPU 210 and a GPU 210 proportional switch 215 shares a common power budget—e.g., share a total power value or a threshold amount of power. In at least one embodiment, the common power budget of the GPU 210 and switch 215 is linear with a number of active links 330. For example, the GPU 210 proportional switch 215 power can be a function of the active number of links 330. In one embodiment, an estimated GPU 210 proportional switch 215 power can be equal to k*GPU 210 proportional link 330 power, where k is an electrical time constant of a power delivery network (PDN) associated with system 200. In some embodiments, the constant k can refer to thermal time constraints of the PDN of system 200. In at least one embodiment, the common power budget of the GPU 210 and switch 215 can be adjusted based on a number of active links 330 determined. In at least one embodiment, the common power budget can be adjusted while ensuring the total baseboard power of the system 200 (e.g., a power of a primary circuit board of the system 200) remains at a maximum threshold. That is, there can be a total power consumption threshold for the system 200, and exceeding the threshold can trigger shutdown signals—e.g., there can be a tripping of the power. In some embodiments, a universal power system (UPS) can have a maximum power threshold for all baseboards—e.g., there can be a total threshold power for the collective baseboards within system 200. In such embodiments, the common power budget of the switch 215 and the GPU 210 can be adjusted while ensuring the total threshold power for the collective baseboards is not exceeded.

In at least one embodiment, multiple types of power can be shared between the GPU 210 and the proportional switch 215. For example, the power can be a thermal design power (TDP) (e.g., a theoretical maximum amount of heat generated by a GPU that its cooling system can dissipate) or be an electrical design power (e.g., the TDP over a microsecond average time). Accordingly, the total power budget of the switch and GPU can be either of the following:

$$TDP = GPU\ TDP + p * \frac{TDP}{Link} \text{ or } EDP = GPU\ EDP + p * \frac{EDP}{Link},$$

where "p" is a number of connected links per GPU. In at least one embodiment, the GPU is estimating the switch power using the formula $$p * \frac{TDP}{Link},$$

where "p" is the number of connected links per GPU and the TDP/Link thermal design power (or electrical design power) allocated for a link.

In at least one embodiment, the PMU 325 can sample the link manager 330-*a* power by determining the potential across resistance 340-*b*. In such embodiments, the PMU 325 can determine if a switch 215 is entering or exiting an idle mode. For example, switch 215 can enter an idle mode when not communicating data across links—e.g., the switch 215 can be inactive if each GPU 210 is internally processing data but not communicating data. In at least one embodiment, PMU 325 can determine that switch 215 is entering the idle mode if a potential across resistance 340-*b* drops—e.g., as links stop communicating data, the link manager 330 can receive less power. In such embodiments, the PMU 325 can adjust the power of the GPU 210 as described with reference to FIG. 4. For example, the PMU 325 can determine that switch 215 is entering an idle mode and allocate the power otherwise reserved for the switch 215 to the GPU 210—e.g., allocate the power saved between the switch 215's active and idle mode to the GPU 210. In at least one embodiment, the PMU 325 can continue to sample the link manager 330 power while the GPU 210 power is at the increased amount. In such embodiments, when the PMU 325 determines the switch is exiting an idle mode (e.g., the potential across resistance 340-*b* increases), PMU 310 can decrease the power provided to the GPU 310—e.g., back to the originally allocated power value. Accordingly, the system can balance the power between the GPU 210 and the switch 215. In some embodiments, the PMU 325 can determine a proportional power used by the switch 215. That is, the switch 215 can utilize power between power used in idle (e.g., close to zero) and power used at peak bandwidth (e.g., a threshold power of the switch 215). Accordingly, the PMU 325 can determine the proportional power used by the switch 215 using either $$TDP = GPU\ TDP + p * \frac{TDP}{Link} \text{ or } EDP = GPU\ EDP + p * \frac{EDP}{Link}.$$

The PMU 325 can allocate additional power to the GPU 210 based on determining the power of the switch 215 is below the threshold power of the switch 215—e.g., the PMU 325 can allocate any unused power (e.g., a difference between the threshold power of the switch 215 and a current estimated power used by the switch 215) to the GPU 210 as described with reference to FIG. 4.

In at least one embodiment, the PMU 325 can utilize a total graphics power (TGP) control loop to adjust the power of the GPU 210—e.g., utilize one or more components not shown to adjust the power of the GPU 210. In some embodiments, the GPU 210 can utilize an EDP control loop to ensure EDP limits and moving averages are not exceeded—e.g., the EDP control loop can throttle the GPU 210 to bring the power consumption down.

Figure 4:
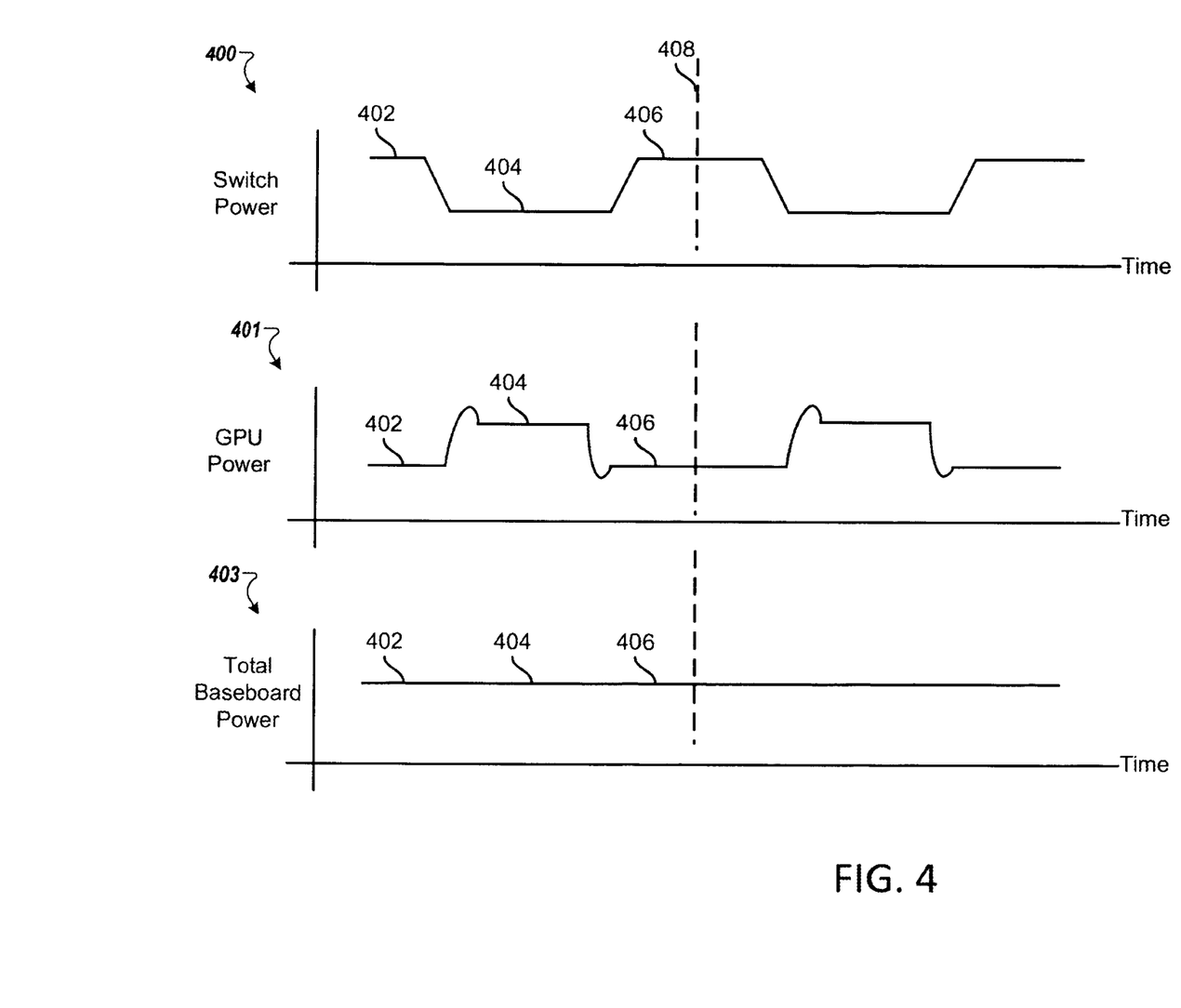
FIG. 4 illustrates a diagram showing a system utilizing power balancing via on-die telemetry data, in accordance with at least some embodiments.

FIG. 4 illustrates timing diagrams 400, 401, and 402 that illustrate, collectively power balancing via on-die telemetry data, according to at least one embodiment. Each diagram can illustrate power over time. For example, timing diagram 400 can illustrate switch (e.g., switch 215 as described with reference to FIG. 2) power over time. In some embodiments, timing diagram 401 can illustrate GPU (e.g., GPU 210 as described with reference to FIG. 2) power over time. In one embodiment, timing diagram 402 can illustrate total baseboard power (E.g., system power or power across a power management controller 335 as described with reference to FIG. 3) over time.

In at least one embodiment, a switch (e.g., switch 215) and GPU (e.g., GPU 210) can share a common power budget as described with reference to FIGS. 2 and 3. In such embodiments, system 200 or system 300 (e.g., the power management unit (PMU) 325) can estimate switch power 402 based on determining k*GPU 210 proportional link 330 power as described with reference to FIG. 3, where k is an electrical or thermal time constant. In at least one embodiment, the PMU 325 can sample a potential across resistance 340-*a* or resistance 340-*b* to determine the link power and the estimated switch power 215. Timing diagrams 400, 401, and 402 illustrate adjusting the switch power 400 or the GPU power 401 responsive to determining the estimated switch power 215 and a maximum total baseboard power 402.

For example, at a time 402, the switch power 402 can be at a maximum switch power value—e.g., a switch 215 can be at peak bandwidth. In some embodiments, at time 402, GPU power 401 can be at a maximum power allocated to the GPU 210—e.g., a peak power allocated for the GPU 210. Accordingly, as the switch 215 and GPU 210 are at a peak power allocated, the total baseboard power 403 can be at a maximum total baseboard power—e.g., the total baseboard power 403 can satisfy a maximum threshold power allocated for the baseboard.

In at least one embodiment, between a time 402 and a time 404, the switch 215 can utilize less power—e.g., the switch 215 can enter an idle mode or otherwise utilize less power for processing and communicating data between GPUs. In at least one embodiment, PMU 325 can determine the switch power 215 is reduced—e.g., the PMU 325 can determine the power at the input current limiter (ICL) as described with reference to FIG. 3 or determine the power based on information received from counters as described with reference to FIG. 5. In either case, the PMU 325 can continuously sample the potential across resistance 340-*a* or resistance 340-*b* at a predetermined rate as described with reference to FIG. 3. In some embodiments, the PMU 325 can adjust the GPU power 401 based on determining the switch power 400 is reduced. For example, between the time 402 and the time 404, the PMU 325 can increase the GPU power 401. In at least one embodiment, the PMU 325 can increase the GPU power 401 by determining common power budget=GPU power 401+switch power 400. That is, the PMU 325 can increase the GPU power 401 until the GPU power 401 and estimated switch power 400 satisfy the common power budget allocated for the GPU 210 and switch 215. For example, at a time 404, the switch 215 can be in an idle or low power (LP) mode. Accordingly, the GPU power 401 can be increased to a second maximum power threshold, such that a combination of the second maximum power threshold and the switch power 401 satisfies the common power budget. That is, the GPU power 401 can be increased beyond an initially allocated GPU power 401 while still satisfying the common power budget. In at least one embodiment, because the switch power 400 is reduced and the GPU power 401 is increased, a total baseboard power 403 can remain constant between time 402 and time 404—e.g., the PMU 325 can allocate the unused switch power 400 to the GPU 210.

In some embodiments, between a time 404 and 406, the switch 215 can begin utilizing additional power—e.g., the switch 215 can exit an idle mode or otherwise use additional power for processing and communicating data between GPUs. In at least one embodiment, PMU 325 can determine the switch power 215 is increased—e.g., the PMU 325 can determine the power at the input current limiter (ICL) as described with reference to FIG. 3 or determine the power based on information received from counters as described with reference to FIG. 5. In either case, the PMU 325 can continuously sample the potential across resistance 340-a or resistance 340-b at a predetermined rate as described with reference to FIG. 3. In at least one embodiment, PMU 325 can adjust the GPU power 401 based on determining the switch power 400 is increased. For example, between the time 404 and the time 406, the PMU 325 can decrease the GPU power 401. In at least one embodiment, the PMU 325 can decrease the GPU power 401 by determining common power budget=GPU power 401+switch power 400. That is, the PMU 325 can decrease the GPU power 401 until the GPU power 401 and estimated switch power 400 satisfy the common power budget allocated for the GPU 210 and switch 215. For example, at a time 404, the switch 215 can be in an idle or low power (LP) mode. Accordingly, the GPU power 401 can be the second maximum power threshold, such that a combination of the second maximum power threshold and the switch power 401 satisfies the common power budget. As the switch power increases following time 404 up to the threshold switch power at time 406, the GPU power 401 can decrease from the second maximum threshold power to the allocated threshold GPU power 401. In at least one embodiment, because the switch power 400 is increased and the GPU power 401 is decreased, a total baseboard power 403 can remain constant between time 404 and time 406.

In some embodiments, the PMU 325 can repeat the operations performed during times 402 and 406 after a time 408—e.g., the PMU 325 can continuously sample and estimate the switch power 400 at a respective rate, and adjust the GPU power 401 accordingly to maintain the overall total baseboard power 403.

Figure 5:
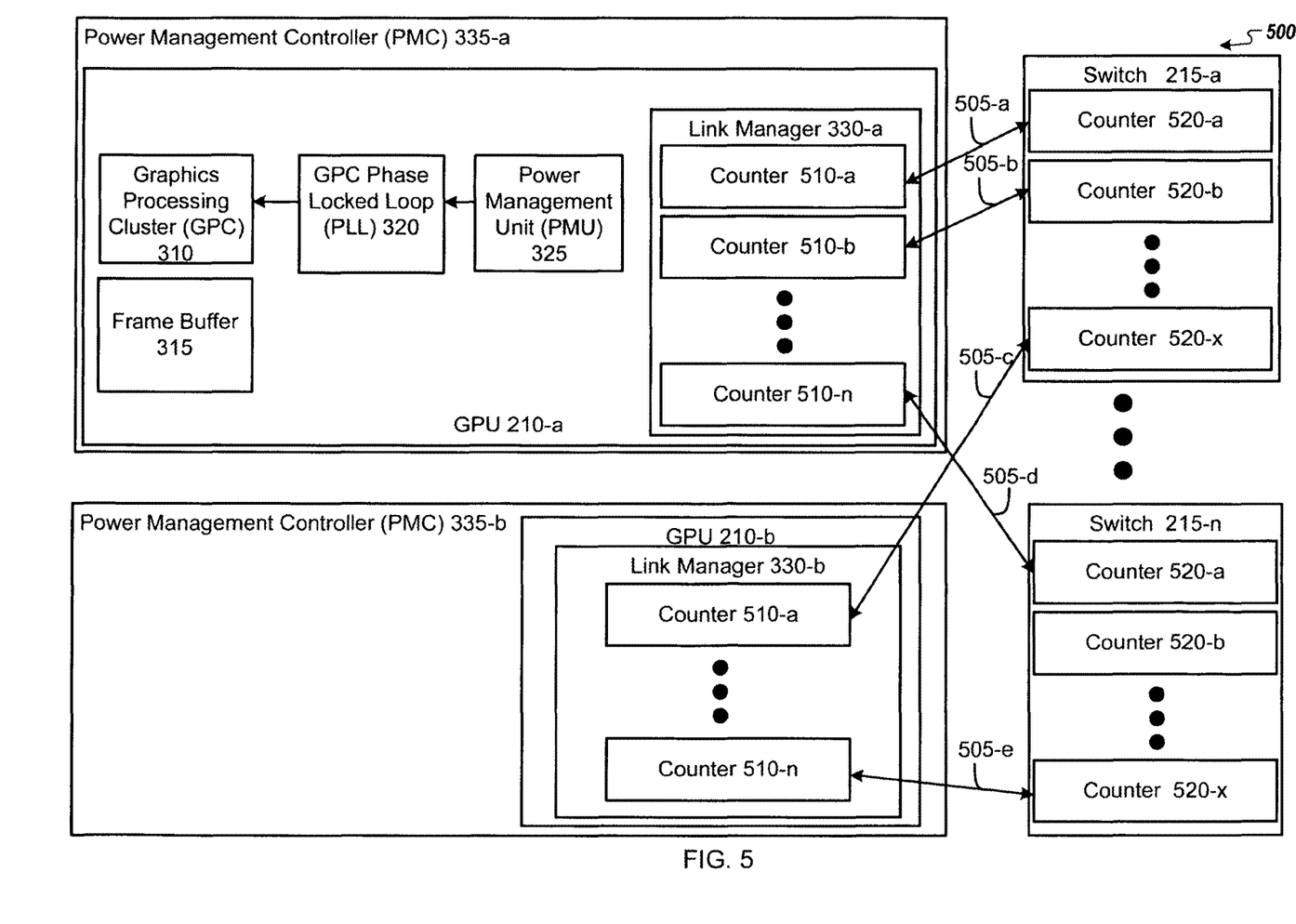
FIG. 5 illustrates an example system utilizing power balancing via on-die telemetry data, in accordance with at least some embodiments.

FIG. 5 illustrates an example system 500 implementing power balancing via on-die telemetry data, according to at least one embodiment. In some embodiments, system 500 can include components described with reference to FIG. 3. For example, system 500 can include a power management controller (PMC) 335-a and a PMC 335-b. In at least one embodiment, the PMC 335 can include a CPU 205 (e.g., a central processing unit (CPU) 205 as described with reference to FIG. 2) and a GPU 210 (e.g., a graphics processing unit (GPU) 210 as described with reference to FIG. 2). In at least one embodiment, the PMC 335 is coupled with a switch 215 via a link 505 as described with reference to FIG. 2—e.g., switch 215-a and switch 215-n can be coupled with GPU 210-a and GPU 210-b via links 505. In at least one embodiment, GPU 210 can include a graphics processing cluster (GPC) 310, a frame buffer (FB) 315, a GPC phase-locked loop (PLL) 320, a power management unit (PMU) 325, and a link manager 330. In some embodiments, one or more components of the GPU 210 can be included within the power management unit (PMU) 325. For example, the GPC 310, frame buffer 315, and link manager 330 can be located inside the power management unit 325 in some embodiments. In at least one embodiment, FIG. 5 illustrates an alternative way to estimate a power consumption of switch 215 as described with reference to FIG. 3.

In at least one embodiment, the GPC 310 is a dedicated hardware block that can perform computations, rasterization, shading, and texturing—e.g., the GPC 310 can perform most of a GPU's core graphics functions. In at least one embodiment, frame buffer 315 is a portion of memory (e.g., random-access memory (RAM)) that stores a bitmap and drivers a video display—e.g., the frame buffer 315 can store data representing pixels in a video frame, a frame rate, or other information associated with a display of the system. In one embodiment, the GPC 310 is coupled with a GPC PLL 320. In at least one embodiment, the GPC PLL 320 is a circuit with a voltage or voltage-driven oscillator that adjusts the frequency of an input signal from the PMU 325. That is, the GPC PLL 320 generates, stabilizes, or modulates signals from the PMU 325 to the GPC 310. In at least one embodiment, power management unit (PMU) 325 can manage power of the GPU 210—e.g., the PMU 325 can increase or decrease the power supplied to the GPU 210 and individual components GPC 310, Frame Buffer 315, the GPC PLL 320, and the link manager 330.

In at least one embodiment, the link manager 330-a can be an example of a component managing an NVLink. In some embodiments, system 500 can estimate a power consumption of a switch by utilizing low power (LP) residency counters—e.g., utilize counters 510 associated with respective links 505. For example, for a given time period, the system 500 can utilize counters 510 for links 505 to calculate a percentage of time that a respective link 505 is in a low power mode versus an active mode—e.g., a mode associated with transmitting or processing data between the GPU 210 and a switch 215. For example, a counter 510-a can be utilized to determine an amount of time a link 505-a is in a low-power mode—e.g., the counter 510-a can track an amount of time the link 505-a is in a low-power mode, and a PMU 325 or other component of the GPU 210 can read the counter 510-a to determine the time the link 505-a spent in the low power mode. In some embodiments, the time the respective link 505 is in the low power mode can be referred to as a low power residency (LP residency). In at least one embodiment, a power consumed by a link 505 scales linearly with LP residency—e.g., as LP residency increases, the power consumed by the link 505 decreases. In at least one embodiment, the PMU 325 or another component within the GPU 210 can store the linear relationship between the LP residency and power consumption of a link 505.

In at least one embodiment, both GPU 210 and switch 215 enter a low power mode synchronously—e.g., the GPU 210 and switch 215 can have an equal LP residency. Accordingly, the system 500 can estimate a power consumption of the switch 215 by determining the LP residency at the GPU 210—e.g., if link 505-a couples the GPU 210-a and the switch 215-a, the power consumption of the switch 215-a can be determined based on an LP residency of GPU 210-a. In at least one embodiment, there can be power consumed by the switch 215 that is not associated with the links 505—e.g., power used by a core of the switch 215 or used by non-GPU 210 connected links. In such embodiments, the non-link portion power consumed by switch 215 can be estimated based on an LP residency of the links 505 and distributed amongst the links for power sloshing—e.g., estimate the non-link power based on link usage. For example, in a single node system, non-GPU 210 connected links can be considered off.

Accordingly, the system 500 can estimate the switch power by polling the link manager 330 and the counters 510. That is, although each switch 215 can include its own set of counters 520 that measure the LP residency, the system 500 can poll the GPU counters 510 to estimate the switch 215 power based on the GPU 210 and switch 215 entering the low power mode synchronously. In at least one embodiment, for asynchronous workloads or asymmetric link usage, the system 500 can still estimate the switch 215 power by determining the per-link level power sloshing described herein—e.g., by determining the link usage as a whole. In at least one embodiment, the method described herein can be implemented even if GPU 210 and switch 215 are on different baseboards.

Figure 6:
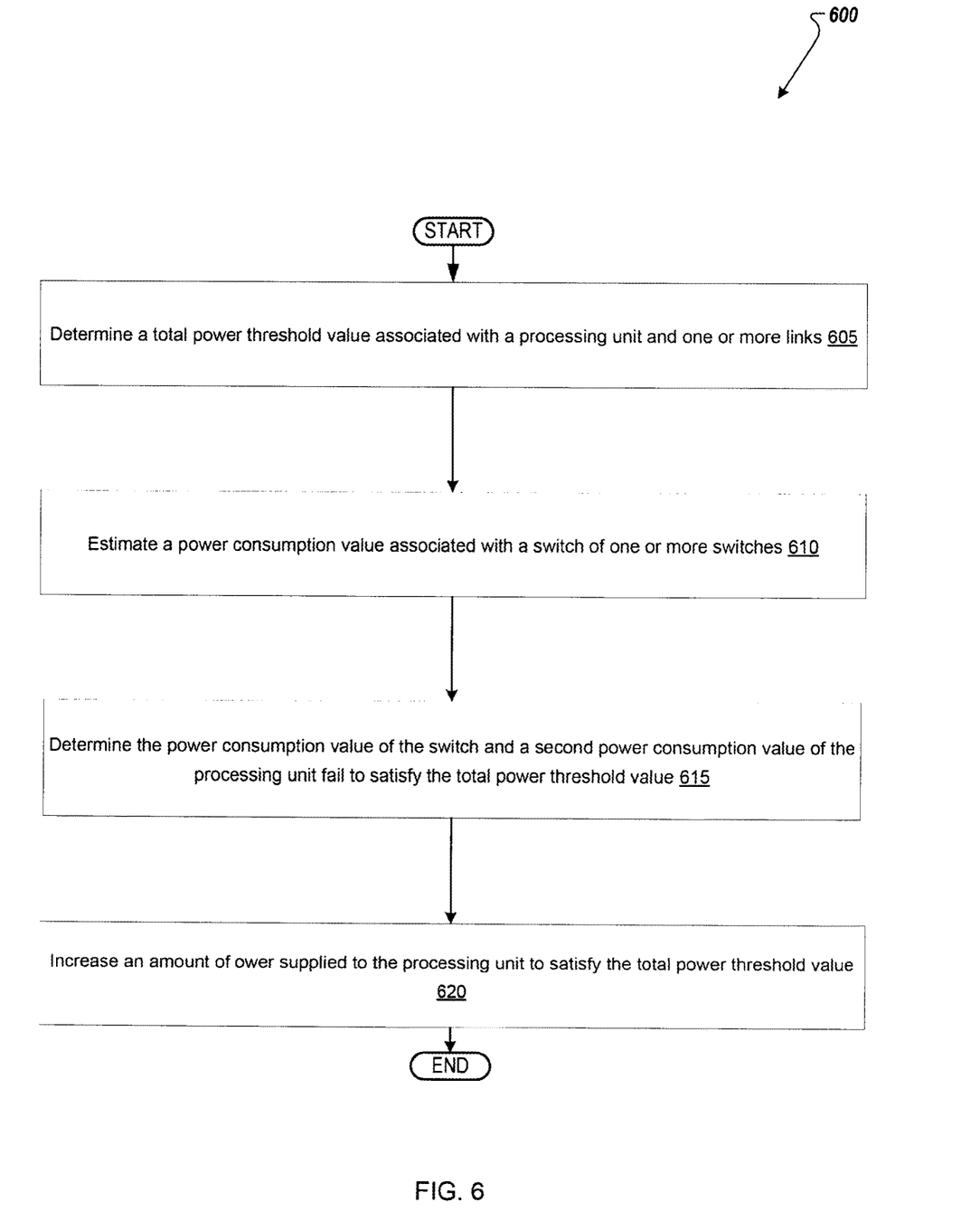
FIG. 6 illustrates a flow diagram of an example method for power balancing via on-die telemetry data, in accordance with at least some embodiments.

FIG. 6 illustrates a flow diagram of a method 600 for system power balancing via on-die telemetry. The method 600 can be performed by processing logic comprising hardware, software, firmware, or any combination thereof. In at least one embodiment, the method 600 is performed by power management unit 325, link manager 330, GPU 210, and switch 215, as described with reference to FIGS. 2-5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments.

At operation 605, processing logic determines a total power threshold value associated with a processing unit and one or more links. For example, the processing logic can determine a total baseboard power threshold as described with reference to FIG. 2—e.g., a total power threshold allocated for the baseboard and components on the baseboard. In at least one embodiment, the processing logic can determine a first power budget of the processing unit e.g., determine a first power budget of a graphics processing unit (GPU) 210 as described with reference to FIG. 2. In at least one embodiment, the processing logic can also determine a second power of the one or more links coupled with the processing unit, where the second power budget is based on a number of links coupled to the processing unit. That is, the processing logic can determine $$TDP = GPU\ TDP + p * \frac{TDP}{Link} \text{ or } EDP = GPU\ EDP + p * \frac{EDP}{Link}$$

as described with reference to FIG. 3. In such examples, the total power threshold value can be associated with a thermal design power of the system or associated with an electrical design power of the system. In at least one embodiment, the processing unit is a graphics processing unit (GPU).

At operation 610, processing logic estimates a power consumption value associated with a switch of one or more switches—e.g., of switch 215 as described with reference to FIG. 2. In at least one embodiment, the processing logic can estimate the power of the switch by determining a difference in voltage across a resistance supplying power to the one or more links—e.g., determine the resistance 340 as described with reference to FIG. 3. In such embodiments, the processing logic can determine one or more links are in an idle mode based on determining the difference in voltage across the resistance. Accordingly, the processing logic can estimate that the switch is in the idle mode responsive to determining the one or more links are idle. In some embodiments, the processing logic can determine that one or more links are not at a threshold power amount and estimate the power consumed by the switch accordingly—e.g., the switch need not be in the idle mode for the processing logic to estimate the power used by the switch. For example, the processing logic can determine a correlation of available link power to the switch, where the estimation of the switch power is based on a number of active links—e.g., the processing logic can determine k*GPU 210 proportional link 330 power as described with reference to FIG. 3. In some embodiments, the processing logic can estimate the power consumption of the switch over a first time period based on a time constant associated with the system as described with reference to FIG. 3. As described with reference to FIG. 5, the switch power can also be estimated by utilizing counters. In such embodiments, the processing logic can calculate an amount of time one or more links are in a lower power mode compared with an active mode—e.g., determine low power (LP) residency as described with reference to FIG. 5. In at least one embodiment, the processing logic can read one or more counters storing information associated with the low power mode where calculating the amount of time one or more links are in the lower power mode is responsive to reading the one or more counters.

At operation 615, processing logic determines that the power consumption value of the switch and a second power consumption value of the processing unit fail to satisfy the total power threshold—e.g., as illustrated by FIG. 4, when the switch power decrease, the total baseboard power can decrease and cause the total power of the switch and the GPU to fail to satisfy the total baseboard power.

At operation 620, processing logic increases an amount of power supplied to the processing unit to satisfy the total power threshold value responsive to determining the power consumption value and the second power consumption value fail to satisfy the total power threshold value. For example, as illustrated in FIG. 4, when the switch power decreases, the GPU power can be increased to satisfy the total baseboard power. Similarly, when the switch power increases, the processing logic can reduce the GPU power to satisfy the total baseboard power. For example, the processing logic can estimate a third power consumption value associated with the switch of the one or more switches, determine the third power consumption value and the second power consumption value of the processing unit exceed the total power threshold value, and decrease the amount of power supplied to the processing unit to satisfy the total power threshold value responsive to determining the total power threshold value is exceeded. In some examples, the processing logic can determine the GPU power and switch power satisfy the total baseboard and refrain from increasing or decreasing the allocated powers. For example, the processing logic can determine the power consumption value of the switch and the second power consumption value of the processing unit satisfy the total power threshold value and refrain from increasing the amount of power supplied to the processing unit.

Figure 7:
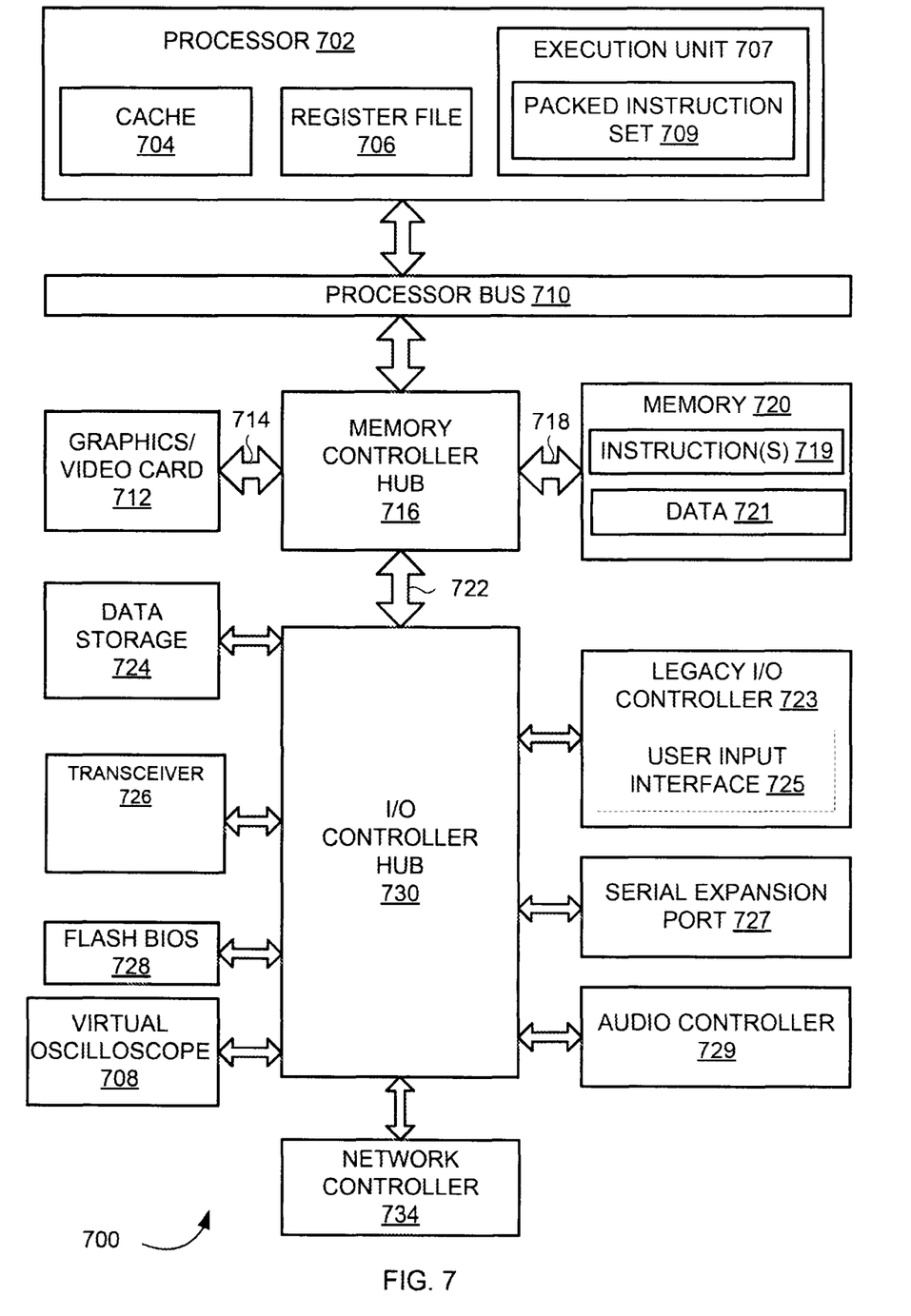
FIG. 7 illustrates a computer system, in accordance with at least some embodiments.

FIG. 7 illustrates a computer system 700 in accordance with at least one embodiment. In at least one embodiment, computer system 700 may be a system with interconnected devices and components, an SOC, or some combination. In at least one embodiment, computer system 700 is formed with a processor 702 that may include execution units to execute an instruction. In at least one embodiment, computer system 700 may include, without limitation, a component, such as a processor 702 to employ execution units including logic to perform algorithms for processing data. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux for example), embedded software, and/or graphical user interfaces, may also be used. [00,50] In at least one embodiment, computer system 700 may be used in other devices, such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 700 may be used in devices such as graphics processing units (GPUs), network adapters, central processing units, and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 700 may include, without limitation, processor 702 that may include, without limitation, one or more execution units 707 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 700 is a single processor desktop or server system. In at least one embodiment, computer system 700 may be a multiprocessor system. In at least one embodiment, processor 702 may include, without limitation, a CISC microprocessor, a RISC microprocessor, a VLIW microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. In at least one embodiment, processor 702 may also include a combination of both internal and external caches. In at least one embodiment, a register file 706 may store different types of data in various registers including, without limitation, integer registers, floating point registers, status registers, and instruction pointer registers.

In at least one embodiment, execution unit 707, including, without limitation, logic to perform integer and floating point operations, also resides in processor 702. Processor 702 may also include a microcode ("ucode") read-only memory ("ROM") that stores microcode for certain macro instructions. In at least one embodiment, processor 702 may include logic to handle a packed instruction set 709. In at least one embodiment, by including packed instruction set 709 in an instruction set of a general-purpose processor 702, along with associated circuitry to execute instructions, operations used by many multimedia applications may be performed using packed data in a general-purpose processor 702. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 700 may include, without limitation, a memory 720. In at least one embodiment, memory 720 may be implemented as a DRAM device, an SRAM device, flash memory device, or other memory devices. Memory 720 may store instruction(s) 719 and/or data 721 represented by data signals that may be executed by processor 702.

In at least one embodiment, a system logic chip may be coupled to processor bus 710 and memory 720. In at least one embodiment, the system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O 722. In at least one embodiment, system logic chip may provide a graphics port for coupling to a graphics controller. In at least one embodiment, MCH 716 may be coupled to memory 720 through high bandwidth memory path 718 and graphics/video card 712 may be coupled to MCH 716 through an Accelerated Graphics Port ("AGP") interconnect 714.

In at least one embodiment, computer system 700 may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, a local I/O bus may include, without limitation, a high-speed I/O bus for connecting peripherals to memory 720, a chipset, and processor 702. Examples may include, without limitation, an audio controller 729, a firmware hub ("flash BIOS") 728, a transceiver 726, a data storage 724, a legacy I/O controller 723 containing a user input interface 725 and a keyboard interface, a serial expansion port 727, such as a USB, and a network controller 734. Data storage 724 may comprise a hard disk drive, a floppy disk drive, a CD-ROM device, a flash memory device, or other mass storage devices. In an embodiment, the transceiver 726 includes a constrained FFE 708.

In at least one embodiment, FIG. 7 illustrates a system, which includes interconnected hardware devices or "chips" in a transceiver 726—e.g., the transceiver 726 includes a chip-to-chip interconnect including a first device and a second device. In at least one embodiment, FIG. 7 may illustrate an exemplary SoC. In at least one embodiment, devices illustrated in FIG. 7 may be interconnected with proprietary interconnects, standardized interconnects (e.g., PCIe), or some combination thereof and utilize a GRS link. In at least one embodiment, one or more components of system 700 are interconnected using compute express link ("CXL") interconnects. In an embodiment, the system 700 can include a switch power estimation component 175 as described with reference to FIG. 1. In such embodiments, the system 700 can estimate a power consumed by a switch and use the estimation to increase a power of a graphics processing unit (GPU) coupled with the switch—e.g., the system 700 can increase the power of the GPU when the switch is using less power than allocated as described with reference to FIGS. 2-5.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a non-transitory computer-readable storage media stores instructions thereon, where the instructions, when executed by a processing device, cause the processing device to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
    a processing unit coupled with one or more switches via one or more links, the processing unit to:
        determine a total power threshold value associated with the processing unit and the one or more links;
        estimate a power consumption value associated with a switch of the one or more switches using on-die telemetry data;
        determine whether the power consumption value of the switch and a second power consumption value of the processing unit fail to satisfy the total power threshold value; and
        responsive to determining that the power consumption value and the second power consumption value fail to satisfy the total power threshold value, increase an amount of power supplied to the processing unit to satisfy the total power threshold value.

2. The system of claim 1, wherein the processing unit is further to:
    estimate a third power consumption value associated with the switch of the one or more switches;
    determine the third power consumption value and the second power consumption value of the processing unit exceed the total power threshold value; and
    decrease the amount of power supplied to the processing unit to satisfy the total power threshold value responsive to determining the total power threshold value is exceeded.

3. The system of claim 1, wherein the processing unit is to:
    determine the power consumption value of the switch and the second power consumption value of the processing unit satisfy the total power threshold value; and
    refrain from increasing the amount of power supplied to the processing unit.

4. The system of claim 1, wherein to determine the total power threshold value, the processing unit is to:
    determine a first power budget of the processing unit; and
    determine a second power budget of the one or more links coupled with the processing unit, wherein the second power budget is based on a number of links coupled to the processing unit.

5. The system of claim 1, wherein the total power threshold value is associated with a thermal design power of the system.

6. The system of claim 1, wherein the total power threshold value is associated with an electrical design power of the system.

7. The system of claim 1, wherein, to estimate the power of the switch, the processing unit is to:
    determine a difference in voltage across a resistance supplying power to the one or more links;
    determine that one or more links are in an idle mode based on determining the difference in voltage across the resistance; and
    estimate the switch is in the idle mode responsive to determining one or more links are idle.

8. The system of claim 1, wherein the processing unit is a graphics processing unit (GPU).

9. The system of claim 1, wherein the power consumption is estimated over a first time period based on a time constant associated with the system.

10. The system of claim 1, wherein, to estimate the power of the switch, the processing unit is to:
    determine a correlation of available link power to the switch, wherein the estimation of switch power is based on a number of active links.

11. The system of claim 1, wherein, to estimate the power of the switch, the processing unit is to:

calculate an amount of time one or more links are in a lower power mode compared with an active mode, wherein the processing unit is to estimate the power of the switch based on the amount of time one or more links are in the lower power mode.

12. The system of claim 11, wherein the processing unit is further to:
read one or more counters storing information associated with the low power mode, wherein calculating the amount of time one or more links are in the lower power mode is responsive to reading the one or more counters.

13. A method comprising:
determining a total power threshold value associated with a processing unit and one or more links coupled to the processing unit;
estimating, using on-die telemetry data, a power consumption value associated with a switch of one or more switches coupled to the processing unit via the one or more links;
determining whether the power consumption value of the switch and a second power consumption value of the processing unit fail to satisfy the total power threshold value; and
responsive to determining that the power consumption value and the second power consumption value fail to satisfy the total power threshold value, increasing an amount of power supplied to the processing unit to satisfy the total power threshold value.

14. The method of claim 13, further comprising:
estimating a third power consumption value associated with the switch of the one or more switches;
determining the third power consumption value and the second power consumption value of the processing unit exceed the total power threshold value; and
decreasing the amount of power supplied to the processing unit to satisfy the total power threshold value responsive to determining the total power threshold value is exceeded.

15. The method of claim 13, further comprising:
determining the power consumption value of the switch and the second power consumption value of the processing unit satisfy the total power threshold value; and
refraining from increasing the amount of power supplied to the processing unit.

16. The method of claim 13, further comprising:
determining a first power budget of the processing unit; and
determining a second power budget of the one or more links coupled with the processing unit, wherein the second power budget is based on a number of links coupled to the processing unit.

17. The method of claim 13, wherein the total power threshold value is associated with a thermal design power of a system comprising the one or more processing units.

18. The method of claim 13, wherein the total power threshold value is associated with an electrical design power of a system comprising the one or more processing units.

19. The method of claim 13, further comprising:
determining a difference in voltage across a resistance supplying power to the one or more links;
determining that one or more links are in an idle mode based on determining the difference in voltage across the resistance; and
estimating the switch is in the idle mode responsive to determining that one or more links are idle.

20. A non-transitory computer-readable medium storing instructions thereon, wherein the instructions, when executed by a processing device, cause the processing device to:
determine a total power threshold value associated with a processing unit and one or more links coupled to the processing unit;
estimate, using on-die telemetry data, a power consumption value associated with a switch of one or more switches coupled to the processing unit via the one or more links;
determine whether the power consumption value of the switch and a second power consumption value of the processing unit fail to satisfy the total power threshold value; and
responsive to determining that the power consumption value and the second power consumption value fail to satisfy the total power threshold value, increase an amount of power supplied to the processing unit to satisfy the total power threshold value.

* * * * *